United States Patent
Schröder

(10) Patent No.: US 9,425,659 B2
(45) Date of Patent: Aug. 23, 2016

(54) SHEET METAL HOLDER FOR RETAINING PERMANENT MAGNETS

(75) Inventor: Lothar Schröder, Karben (DE)

(73) Assignee: Continental Automotive GmbH, Hannover (DE)

( * ) Notice: Subject to any disclaimer, the term of this patent is extended or adjusted under 35 U.S.C. 154(b) by 180 days.

(21) Appl. No.: 13/879,576

(22) PCT Filed: Oct. 13, 2011

(86) PCT No.: PCT/EP2011/067867
§ 371 (c)(1),
(2), (4) Date: Apr. 17, 2013

(87) PCT Pub. No.: WO2012/049236
PCT Pub. Date: Apr. 19, 2012

(65) Prior Publication Data
US 2013/0200740 A1    Aug. 8, 2013

(30) Foreign Application Priority Data
Oct. 14, 2010 (DE) .......... 10 2010 048 310

(51) Int. Cl.
H02K 1/28 (2006.01)
H02K 1/27 (2006.01)

(52) U.S. Cl.
CPC ........... H02K 1/28 (2013.01); H02K 1/274 (2013.01); H02K 1/278 (2013.01); H02K 1/2746 (2013.01); H02K 1/2753 (2013.01)

(58) Field of Classification Search
CPC ........ H02K 1/27; H02K 1/274; H02K 1/278; H02K 1/2706; H02K 1/2746; H02K 1/2753; H02K 1/28; H02K 1/30
USPC ............... 310/156, 156.21, 156.28, 156.29, 310/156.31, 156.01, 156.08, 156.12
See application file for complete search history.

(56) References Cited

U.S. PATENT DOCUMENTS

| | | | | |
|---|---|---|---|---|
| 2,877,366 A * | 3/1959 | Carr | ........................ | 310/156.51 |
| 3,427,486 A * | 2/1969 | Whitney | ....................... | 310/180 |
| 3,531,670 A * | 9/1970 | Loudon | .................... | 310/156.28 |
| 5,574,323 A * | 11/1996 | Nusser | ..................... | 310/156.22 |
| 5,578,885 A * | 11/1996 | Alford et al. | ................. | 310/263 |
| 6,013,967 A * | 1/2000 | Ragaly | ................. | H02K 21/044 310/181 |
| 6,013,968 A | 1/2000 | Lechner et al. | | |
| 6,144,131 A * | 11/2000 | Hollenbeck et al. | .... | 310/156.53 |
| 6,744,165 B2 * | 6/2004 | York | .................... | H02K 21/044 310/156.68 |
| 7,038,343 B2 * | 5/2006 | Agnes | ...................... | H02K 1/17 29/596 |
| 7,057,320 B2 * | 6/2006 | Abordi et al. | ................ | 310/103 |
| 7,183,683 B2 * | 2/2007 | Shafer et al. | ............ | 310/156.28 |
| 2008/0278018 A1 * | 11/2008 | Achor | ..................... | 310/156.12 |
| 2009/0033167 A1 | 2/2009 | Bradfield | | |
| 2012/0032548 A1 | 2/2012 | Bauch et al. | | |

FOREIGN PATENT DOCUMENTS

DE     43 31 803 A1     3/1995
DE     298 01 184       5/1999

(Continued)

*Primary Examiner* — Terrance Kenerly
*Assistant Examiner* — Alexander Singh
(74) *Attorney, Agent, or Firm* — Cozen O'Connor

(57) ABSTRACT

A rotor for an electric motor. A rotor for an electric motor has a main rotor body which includes radial support surfaces. In addition, the rotor has permanent magnet bodies which are arranged radially externally on the radial support surfaces. Associated with each permanent magnet body is a sheet metal holder which at least partially covers the respective permanent magnet body on the side thereof remote from the support surface and which is designed and arranged such that it secures this permanent magnet body in the radial direction.

13 Claims, 2 Drawing Sheets

(56) References Cited

FOREIGN PATENT DOCUMENTS

| DE | 298 01 184 U1 | 5/1999 |
| DE | 198 32 253 | 1/2000 |
| DE | 198 32 253 A1 | 1/2000 |
| DE | 10 2008 048 944 A1 | 2/2009 |
| DE | 10 2008 048944 | 2/2009 |
| DE | 10 2008 043 144 A1 | 4/2010 |
| DE | 10 2008 043144 | 4/2010 |

* cited by examiner

SHEET METAL HOLDER FOR RETAINING PERMANENT MAGNETS

CROSS REFERENCE TO RELATED APPLICATIONS

This is a U.S. national stage of application No. PCT/EP2011/067867, filed on 13 Oct. 2011. Priority is claimed on German, Application No. 10 2010 048 310.9 filed 14 Oct. 2010, the content of which is incorporated here by reference.

BACKGROUND OF THE INVENTION

1. Field of the Invention

The invention relates to a rotor for an electric motor.

2. Description of Prior Art

Electric motors generally have a rotor and a stator. So-called brushless DC motors, which are also referred to as BLDC motors, are becoming increasingly prevalent in the automotive engineering sector. Such BLDC motors are synchronous motors driven by a direct current and have an electronic commutation device, instead of mechanical commutators and brushes.

In this way, relatively low levels of friction in comparison with motors with commutators and brushes are ensured, which therefore has a positive effect on efficiency. Furthermore, so-called brush sparking can be avoided, which firstly results in electrical losses and secondly also contributes to increased mechanical wear.

The rotor, for example of BLDC motors, has a rotor basic body, on which permanent magnets are arranged. Owing to the fact that no coil windings are located on the rotor, the windings are not subject to centrifugal forces. In addition, windings are arranged only on the stator, with the result that no air cooling is required in the region of the rotor for cooling purposes and therefore the inner region, in particular the region of the rotor in which the permanent magnets are arranged, can be encapsulated from the outside and can thus also be protected from dirt particles and other external particles.

DE 10 2008 043 144 A1 discloses an electric machine in the form of a claw-pole generator. A rotor has claw-pole fingers. Interspaces in which permanent magnets are arranged are located between the individual axially conical claw-pole fingers of the claw poles. The permanent magnets reduce leakage flux. The permanent magnets are fastened in the interspaces between the individual claw-pole fingers by holding elements. For this purpose, the holding elements are inserted into pole slots in the claw-pole fingers.

DE 198 32 253 A1 discloses an electric motor with a rotor and a stator. The rotor has at least two permanently magnetic magnet shells that are separate from one another. The stator is arranged concentrically around the rotor and has electrical coils. A holding element consisting of magnetically nonconductive material for holding the magnet shells is provided. The magnet shells bear on their radially outer side against in each case at least one holding shell. The holding shell is preferably a material with a high magnetic conductivity. The holding shells of two magnet shells are spaced apart from one another and are pretensioned in the direction of the rotor axis by the holding element arranged in a lateral region of the magnet shells.

DE 10 2008 048 944 A1 discloses an AC generator with a rotor and a stator. The stator is arranged radially outside the rotor and extends axially along the length of the rotor and extends around the circumference of the rotor. The stator and the rotor are arranged in a housing. The rotor comprises one or more permanent magnets, which are arranged in magnet slots between rotor poles. The rotor comprises a rotor core and one or more magnet slots between rotor poles. The respective magnet slot has a tapering cross section such that the slot width increases as the radial extent of the slot increases from the shaft. A slot lip extends on the circumference of at least one of the rotor poles in the direction of an opposite rotor pole at a radially outer end of the rotor poles. A holding element is provided for locking the magnet in the magnet slot in a radial direction. The holding element is arranged in the magnet slot radially between the magnet and the slot lip.

DE 298 01 184 U1 discloses a generator for a motor vehicle with an excitation system comprising a multiplicity of electrically excited individual poles in a rotor, in the form of claw poles excited by at least one common field coil. Permanent magnets are introduced into the free spaces between the claw poles pointing axially towards one another of the pole plates fitted on the axial ends of the rotor, for compensation of the magnetic leakage flux. The permanent magnets are supported by a holder with respect to centrifugal forces and are held thereby. The holder is formed from two nonmagnetic accommodating cages each having a ring-shaped disk. Multiple chamfered strip sections are formed integrally on the ring-shaped disk and form in each case one accommodating chamber for at least one permanent magnet per free space. Each accommodating chamber is closed at least towards the axial center of the rotor and towards the centrifugally loaded side of the free spaces. The accommodating chamber is fixed on the claw poles and/or the pole plates.

SUMMARY OF THE INVENTION

An object of the invention is to provide a rotor for an electric motor which firstly can be produced inexpensively and secondly contributes to reliable operation.

In one embodiment of the invention a rotor for an electric motor has a rotor basic body, which has radial resting surfaces. In addition, the rotor has permanent magnet bodies, which are arranged pointing radially outwards, on the radial resting surfaces. In each case one sheet-metal holder is associated with the respective permanent magnet body, which sheet-metal holder covers the respective permanent magnet body at least partially on its side facing away from the respective resting surface and is formed and arranged in such a way that it fixes the respective permanent magnet body radially with respect to the rotor basic body. In this way, the respective permanent magnet bodies can be fixed radially with respect to the rotor basic body in a reliable manner by the sheet-metal holders, which can be produced inexpensively, which makes an important contribution to reliable operation of the rotor owing to the centrifugal forces occurring during rotation of the rotor.

It is possible to use right-parallelepipedal permanent magnet bodies that can be produced inexpensively and do not need to have any special tracks for a direct form-fitting connection with the rotor basic body. It is therefore possible to dispense with especially shaped, in particular shell-shaped, permanent magnet bodies, which are especially sintered in this shape.

Furthermore, in comparison with approaches in which permanent magnets are connected to the rotor basic body by an injection-molding method, it is then also possible to dispense with special contours in the permanent magnet bodies which produce a recess to hold the centrifugal forces during operation.

Preferably the sheet-metal holders have magnetically favorable properties and contribute to a reduction in an air gap between the rotor and a stator of the motor, by virtue of a magnetically conductive material. It is thus possible for steel to be used for the sheet-metal holders.

In one embodiment of the invention, the respective sheet-metal holder covers the respective permanent magnet body on its side facing away from the respective resting surface in the circumferential direction of the rotor in a central region of the respective permanent magnet body and leaves respective peripheral regions in the circumferential direction blank. This can be particularly effective in reducing an air gap between the rotor and the stator in the central region and thus to increase the efficiency of the motor. Furthermore, leaving the peripheral regions blank contributes to the width of the air gap in the peripheral regions not falling below a critical value, possibly based on the component part tolerances. Particularly advantageously, this comes to bear when using right-parallelepipedal permanent magnet bodies, which, owing to their geometry, contribute to the air gap, without taking into consideration the respective sheet-metal holder, being substantially wider in the respective central region than in the peripheral regions. It is thus possible to make the profile of the width of the respective air gap more uniform in the circumferential direction by virtue of the provision of the sheet-metal holders, in addition to their function of mechanically fixing the permanent magnet bodies.

In one embodiment, the respective sheet-metal holder comprises a contact-pressure unit in the region in which the respective permanent magnet body is covered on its side facing away from the respective resting surface. The contact-pressure unit is designed such that it exerts a pretensioning force, which is directed radially inwards, on the respective permanent magnet body. It is thus possible to contribute to particularly reliable fixing of the respective permanent magnet body taking into consideration the fact that the respective individual component parts of the rotor are subject to manufacturing tolerances.

It is particularly advantageous in this context if the contact-pressure unit comprises a bead, which can be provided easily in the case of the sheet-metal holder. Furthermore, it is also advantageous in this context if the contact-pressure unit comprises a bow since this can also be produced particularly easily.

In one embodiment, a tangential fixing element is provided, which is formed and arranged such that it tangentially fixes the respective permanent magnet body in relation to the rotor basic body. It is thus possible to maintain a desired position of the permanent magnet body, which is predetermined in relation to the respective resting surface in a circumference direction even during relatively long operation in a very reliable manner. Particularly advantageously, the fixing element can be in the form of adhesive bonding. However, it can also advantageously be in the form of a molding element, which can be arranged between two adjacent permanent magnet bodies in the circumferential direction.

In one embodiment, the respective sheet-metal holders are coupled to the respectively adjacent sheet-metal holders by form-fitting elements. In this way, the individual sheet-metal holders can be fixed in a particularly favorable manner and thus in particular interlinking of the individual form-fitting elements can occur around a part or else the entire circumference of the rotor.

In one embodiment, the respective sheet-metal holders are coupled to the respective adjacent sheet-metal holder by welding. As an alternative or in addition, the respective sheet-metal holders can also be coupled to the rotor basic body, for example via a form-fitting connection or else welding, in particular laser welding.

In one embodiment, a sheet-metal cage comprises at least one cage unit, by which the plurality of sheet-metal holders are integrally formed. In this way, a particularly inexpensive production of the sheet-metal holders is possible for example using a stamping and bending method. In this context, it is particularly advantageous if a plurality of cage units are coupled to one another by form-fitting elements or are coupled to one another by welded joints. In this way, the sheet-metal cage can be produced in a particularly favorable manner. In particular, the individual cage units can thus be positioned onto the respective resting surfaces once the permanent magnet bodies have been applied and can then be coupled to one another, for example by the form-fitting elements or else by the welded joints, which enables simple manufacture.

BRIEF DESCRIPTION OF THE DRAWINGS

Exemplary embodiments of the invention are explained in more detail below with reference to the schematic drawings, in which.

Elements having the same construction or function are identified by the same reference symbols throughout the figures.

DETAILED DESCRIPTION OF THE PREFERRED EMBODIMENTS

Figure 1:
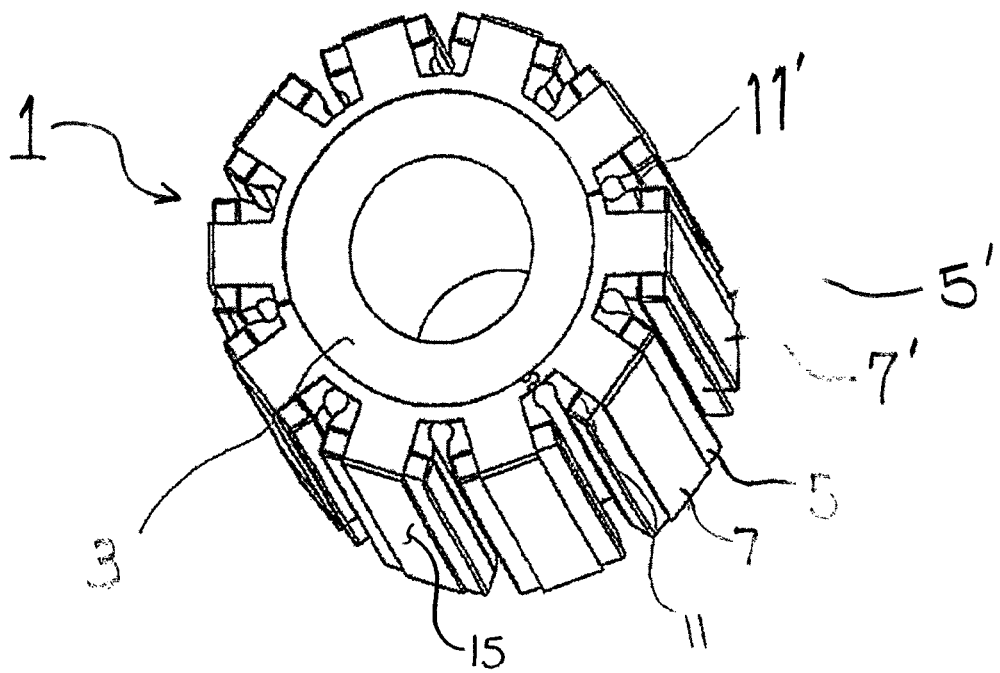
FIG. 1 is a rotor in a perspective view.

A rotor 1 (FIG. 1) has a rotor basic body 3, which comprises a rotor laminate stack, for example. Furthermore, a plurality of permanent magnet bodies 5, 5' is arranged on the rotor basic body 3 in the circumferential direction. In the present exemplary embodiment, there are ten permanent magnet bodies 5, 5'. In alternative configurations, this number can deviate as desired and therefore be higher or even lower. Furthermore, sheet-metal holders 7, 7' are provided which are formed and arranged such that they fix the respective permanent magnets 5, 5' radially with respect to the rotor basic body 3.

The rotor basic body 3 has radial resting surfaces 11, 11'. The permanent magnet bodies are arranged pointing radially outwards on the radial resting surfaces 11, 11'. The permanent magnet bodies can in principle have various contours. Thus, for example, they can also have a shape which approximates the circular contour of the rotor towards the outside. Preferably, the permanent magnet bodies 5, 5' are in the form of right-parallelepipeds, which makes a contribution to particularly inexpensive production.

Figure 2:
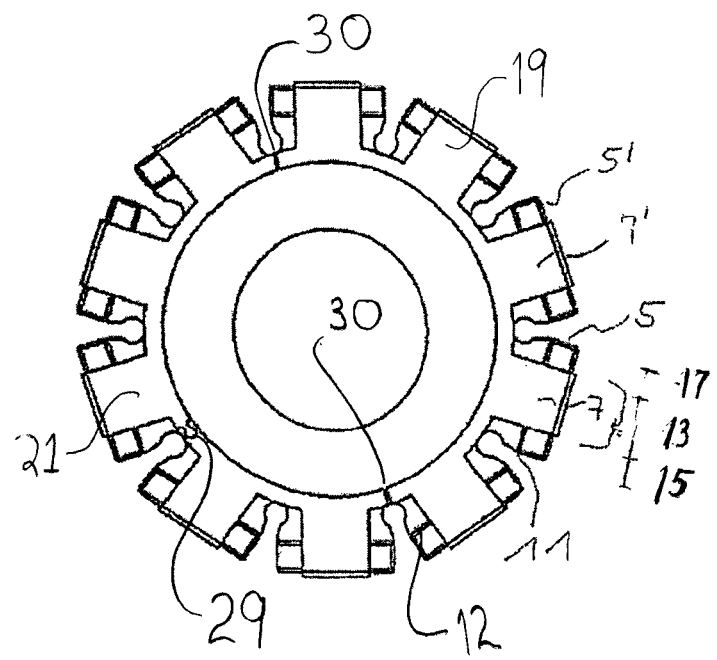
FIG. 2 is the rotor in a view orthogonal to its axis of rotation.

In each case one sheet-metal holder 7, 7' is associated with the respective permanent magnet body 5, 5', which sheet-metal holder 7, 7' at least partially covers the respective permanent magnet body 5, 5' on its side facing away from the respective resting surface 11, 11' and is formed and arranged in such a way that it fixes the respective permanent magnet body 5, 5' radially with respect to the rotor basic body 3. The sheet-metal holder 7, 7' is thus in particular in the form of a lug. In the exemplary embodiment illustrated, the respective sheet-metal holder 7, 7' covers the respective permanent magnet body 5, 5' on its side facing away from the respective resting surface 11, 11' in the circumferential direction of the rotor in a central region 13 of the respective permanent magnet body 5, 5' and leaves respective peripheral (FIG. 2)

regions 15, 17 blank in the circumferential direction. In this way, in particular in the case of a right-parallelepipedal formation of the respective permanent magnet body 5, 5', it is possible to make a contribution to making a profile of the air gap in the circumferential direction of the rotor 1 more uniform. Preferably, the respective sheet-metal holder 7, 7' is formed from a steel which generally has good magnetic conductivity. In particular, the steel has a suitable iron content. The peripheral region 15, 17 extends in the circumferential direction over a width that is dependent on a thickness of the sheet metal used for the sheet-metal holder 7, 7' and an air gap width which at least needs to be maintained between the rotor 1 and the stator.

The respective sheet-metal holder has a contact-pressure unit 15 in the region in which the respective permanent magnet body 5, 5' is covered on its side facing away from the respective resting surface 11, 11', which contact-pressure unit is formed such that it exerts a pretensioning force, directed radially inwards, on the respective permanent magnet body. The contact-pressure unit 15 thus comprises a bead 16 and/or a bow 40, for example.

The respective sheet-metal holders 7, 7' can each have form-fitting elements 29, with which they are coupled to respectively adjacent sheet-metal holders 7, 7' and are therefore arranged in particular in the form of a chain around the circumference of the rotor. As an alternative or in addition, the respective sheet-metal holders 7, 7' can also be coupled to the respective adjacent sheet-metal holders 7, 7' by welding with a weld 30. They can also alternatively or additionally be coupled directly to the rotor basic body 3, for example via a form-fitting connection or welding. Preferably, the type of welding used is laser welding.

FIG. 2 shows that a sheet-metal cage is formed which comprises at least one cage unit 19, 21, by which a plurality of sheet-metal holders 7, 7' are formed integrally.

In the exemplary embodiment shown in FIG. 2, the sheet-metal cage comprises two cage units 19, 21 which each extend over half of the circumference of the rotor 1. In principle, however, these can also extend in another way around the circumference of the rotor 1 or else comprise more than two cage units 19, 21. A single cage unit 19, 21 can then be produced in a particularly simple manner, in particular by a stamping and bending method. The single cage unit 19, 21 can preferably also be fitted individually on the rotor basic body once the permanent magnet bodies 5, 5' have been positioned.

Figure 3:
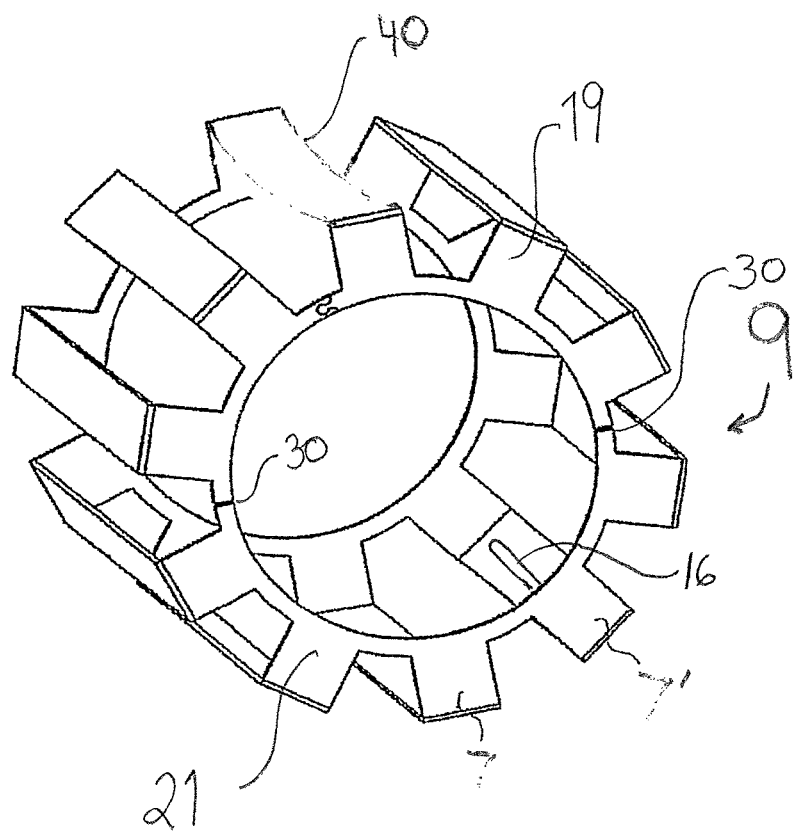
FIG. 3 are a plurality of sheet-metal holders in the form of a sheet-metal cage.

Preferably, the respective cage units 19, 21 are then coupled to one another by welding and/or corresponding form-fitting elements, with the result that the cage units 19, 21 form a sheet-metal cage 9 shown in FIG. 3. The cage units 19, 21 can thus be positioned on the rotor basic body 3 in particular in the radial direction during production. Alternatively, the sheet-metal cage can be prefabricated prior to fitting on the rotor basic body 3 such that it extends in principle in the complete circumferential direction around the rotor 1 with corresponding sheet-metal holders 7, 7' and is then pushed onto the rotor basic body and the permanent magnet bodies 5, 5' in the axial direction. In this case, the sheet-metal cage has, during the push-on process, not yet been provided, at its front end, with a star-shaped body provided at the front end in the view in FIG. 2, but is connected, after having been pushed on, by a welded joint at the axial edges of the sheet-metal holders 7, 7' by a corresponding star in particular by a welded joint, and is thus fitted to form the finished sheet-metal cage.

It may be particularly advantageous for production if the permanent magnet bodies 5, 5' are only magnetized after fitting of the respective sheet-metal holders 7, 7'.

The rotor 1 is characterized in particular in that very good radial fixing of the permanent magnet bodies 5, 5' can be ensured and also a very high rotation speed limit can be reached, in particular one which is higher than in the case of encapsulation by injection molding at the front end, which can in principle be dispensed with completely. Furthermore, axial fitting in the stator is not impeded.

The sheet-metal thickness can be approximately 0.3 mm in one embodiment.

Furthermore, a tangential fixing element 12 can be provided which is arranged and formed such that it fixes the respective permanent magnet body 5, 5' tangentially with respect to the rotor basic body. The fixing element 12 can be in the form of adhesive bonding between the resting surface 11, 11' and the permanent magnet body 5, 5'. However, it is also possible for it to be formed by suitable moldings, which are inserted into the interspaces between the respective permanent magnet bodies 5, 5'.

The rotor 1 is preferably used in an electric motor which also has a stator in addition to the rotor. Then, corresponding windings can be arranged on the stator, by which windings an in particular rotating magnetic field is impressed, which acts on the rotor 1. For example, the rotor 1 can be used for a BLDC motor. However, it can in principle also be used for other types of motors, such as a regular synchronous machine, for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor for an electric motor, comprising:
a rotor basic body having a longitudinal axis, axial ends, and a plurality of radial resting surfaces;
a plurality of permanent magnet bodies, each arranged on a respective one of the radial resting surfaces, each of the plurality of permanent magnet bodies pointing radially outwards, each of the plurality of permanent magnet bodies having a radial outer circumferential surface radially outward of the radial resting surfaces;
a sheet-metal holder associated with each respective permanent magnet body arranged on a portion of the radial outer circumferential surface of each of the plurality of permanent magnet bodies;
wherein the sheet-metal holder is configured to fix the respective permanent magnet body radially with respect to the rotor basic body, and
wherein the respective sheet-metal holder covers the respective permanent magnet body on its side facing away from the respective resting surface in a circumferential direction of the rotor in a central region of the respective permanent magnet body from a first longitudinal end of the respective permanent magnet body to a second longitudinal end of the respective permanent magnet body parallel to the longitudinal axis and leaves respective peripheral regions uncovered, wherein the sheet metal holder has a plurality of legs that extend radially inwards towards the longitudinal axis at each respective longitudinal end of the plurality of permanent magnet bodies that corresponds with the axial ends of the rotor basic body and each leg terminates at a radially inner end, the radially inner ends of the respective legs being joined by a ring arranged at the axial ends of the rotor body, wherein an entire radial outer circumferential surface of each of the plurality of permanent magnet bodies is planar.

2. The rotor as claimed in claim 1, wherein each respective sheet-metal holder comprises a contact-pressure unit in a region in which the respective permanent magnet body is covered on its side facing away from the respective resting surface and configured to exert a pretensioning force which is directed radially inwards on the respective permanent magnet body.

3. The rotor as claimed in claim 2, wherein the contact-pressure unit comprises a bead.

4. The rotor as claimed in claim 2, wherein the contact-pressure unit comprises a bow.

5. The rotor as claimed in claim 1, further comprising a tangential fixing element configured to tangentially fix each permanent magnet body in relation to the rotor basic body.

6. The rotor as claimed in claim 5, wherein the tangential fixing element is an adhesive bonding.

7. The rotor as claimed in claim 5, wherein the tangential fixing element is a molded body arranged between two adjacent permanent magnet bodies in a circumferential direction.

8. The rotor as claimed in claim 1, wherein the respective sheet-metal holders are coupled to respectively adjacent sheet-metal holders by form-fitting elements.

9. The rotor as claimed in claim 1, further comprising a weld joint configured to couple respective adjacent sheet-metal holder by welding.

10. The rotor as claimed in claim 1, wherein a sheet-metal cage comprises at least one cage unit, by which a plurality of sheet-metal holders are integrally formed.

11. The rotor as claimed in claim 10, wherein a plurality of cage units are coupled to one another by form-fitting elements.

12. The rotor as claimed in claim 11, wherein the plurality of cage units are coupled to one another by a welded joint.

13. The rotor as claimed in claim 10, wherein a plurality of cage units are coupled to one another by a welded joint.

\* \* \* \* \*